Dec. 18, 1956    J. C. McNEICE    2,774,154
EARTH MOVING ATTACHMENT FOR TRACTORS
Filed Nov. 30, 1953    4 Sheets-Sheet 1
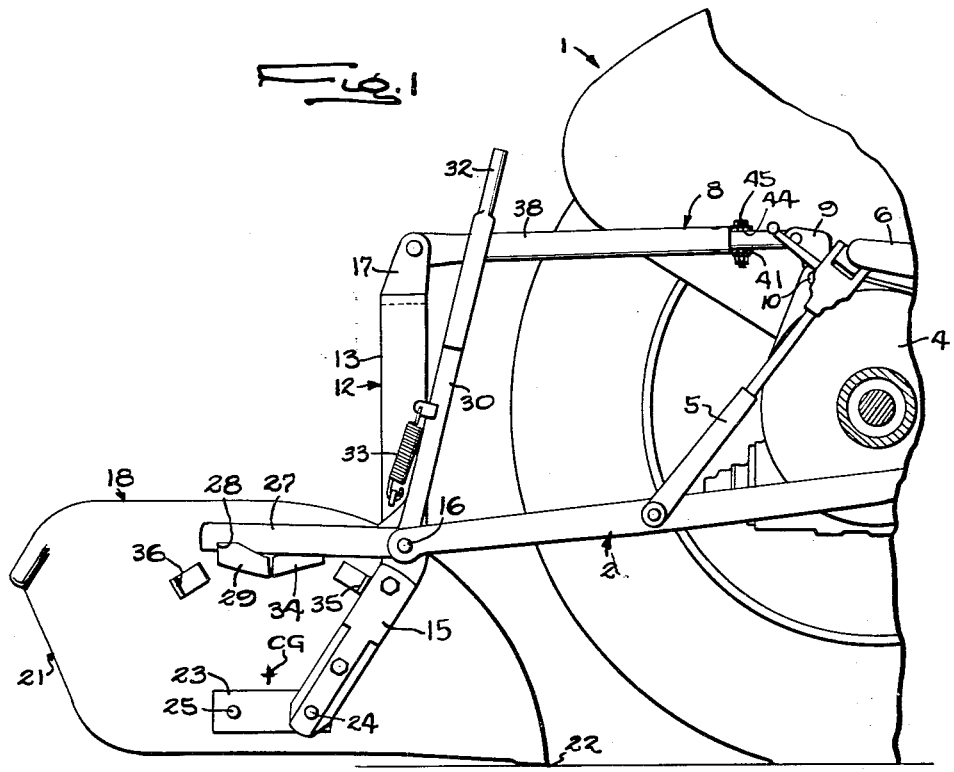
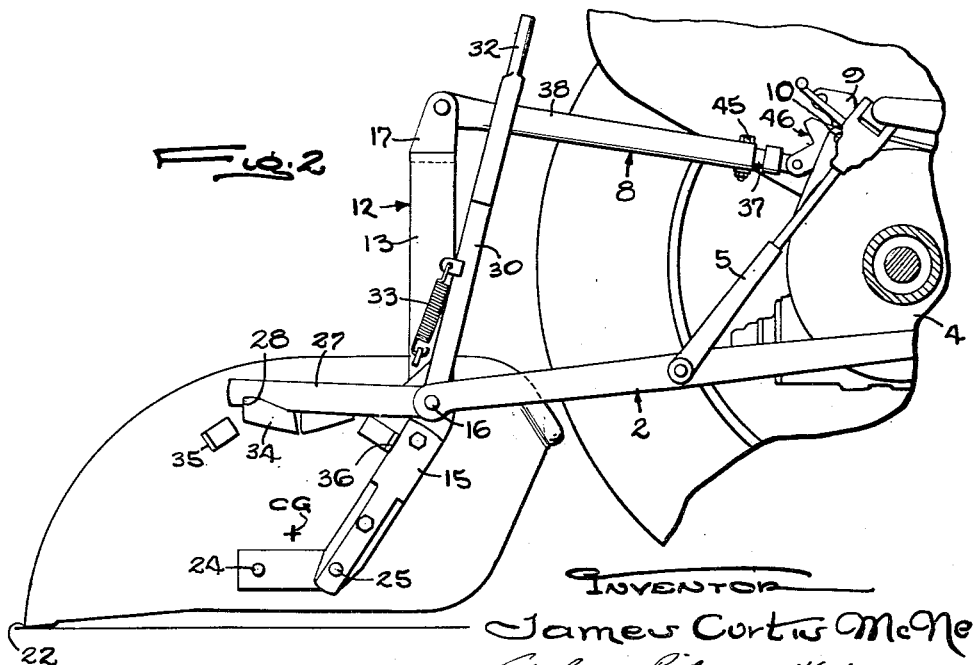
INVENTOR
James Curtis McNeice
Carlson, Pitzner, Hubbard & Wolfe
ATTORNEY

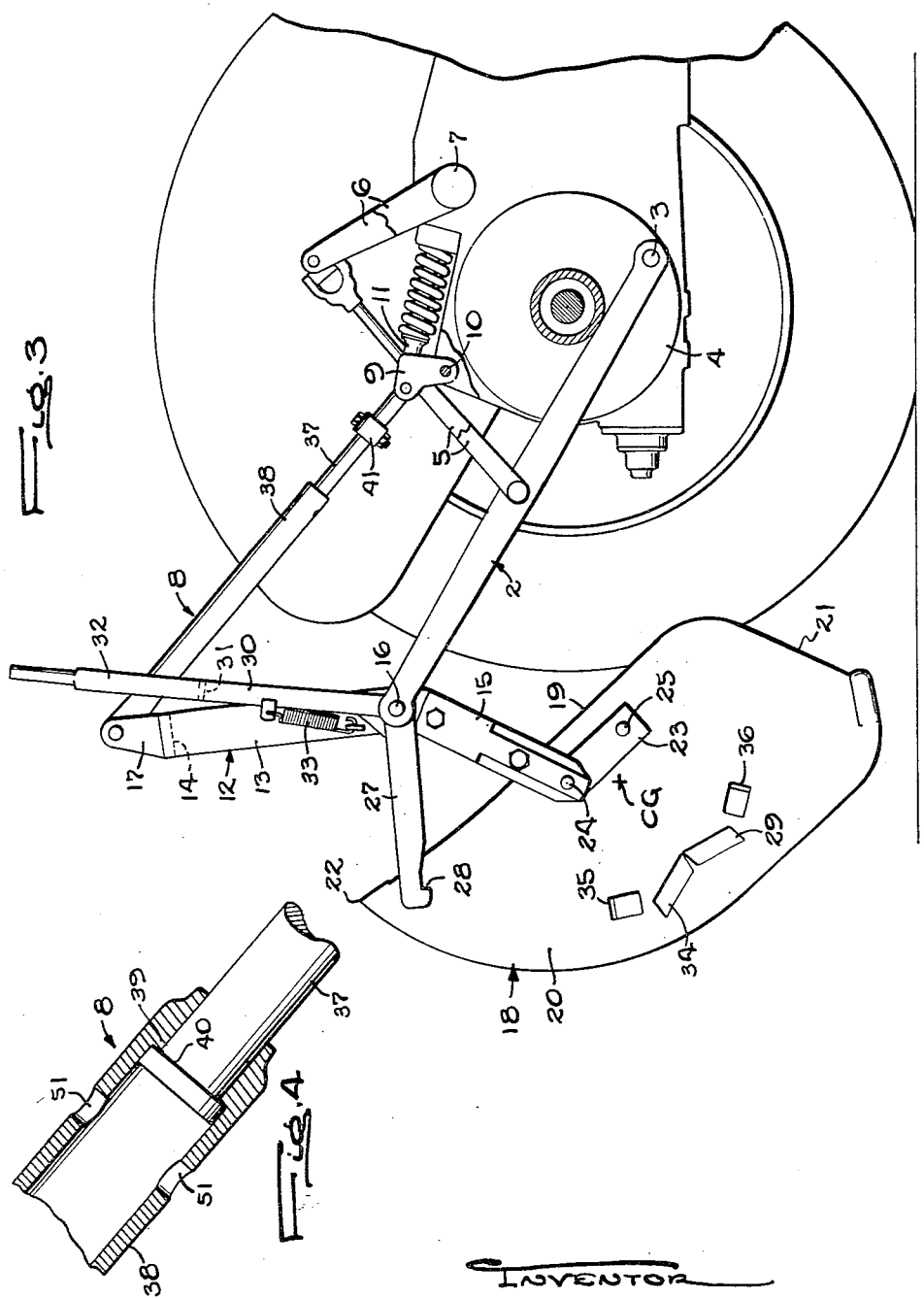

Dec. 18, 1956 J. C. McNEICE 2,774,154
EARTH MOVING ATTACHMENT FOR TRACTORS
Filed Nov. 30, 1953 4 Sheets-Sheet 3

INVENTOR
James Curtis McNeice
Carlson, Pitzner, Hubbard & Wolfe
ATTORNEY

Dec. 18, 1956        J. C. McNEICE        2,774,154
EARTH MOVING ATTACHMENT FOR TRACTORS
Filed Nov. 30, 1953        4 Sheets-Sheet 4
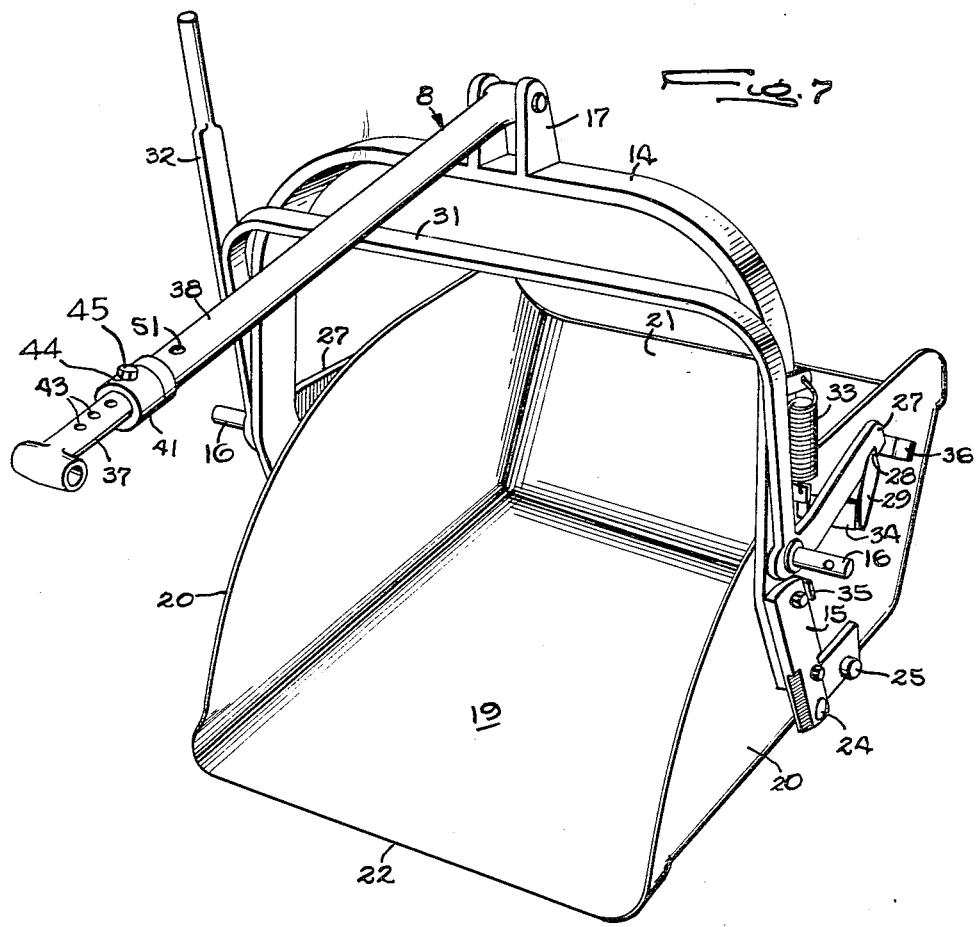
INVENTOR
James Curtis McNeice
Carlsen, Pitzner, Hubbard & Wolfe
ATTORNEY

United States Patent Office 2,774,154
Patented Dec. 18, 1956

2,774,154
EARTH MOVING ATTACHMENT FOR TRACTORS

James Curtis McNeice, Lillington, Leamington Spa, England, assignor to Massey-Harris-Ferguson (Sales) Limited, a British company Application November 30, 1953, Serial No. 395,217

Claims priority, application Great Britain December 1, 1952

3 Claims. (Cl. 37—126)

This invention relates to an earth moving attachment for tractors and has particular reference to dig and carry implements attachable to the draft links of a tractor incorporating automatic draft control.

One type of earth moving implement finding particular utility is the dig and carry type of scoop or scraper. In such an arrangement the scoop or scraper is supported by a frame connected to the tractor hitch links so that upon completion of the earth moving operation the implement can be raised by elevation of the tractor draft links and the scoop dumped under the control of the tractor operator. For particular earth moving operations, an implement capable of operation when pushed by a reversely traveling tractor as well as when drawn by a forwardly moving tractor would be particularly useful.

It is, therefore, an object of my invention to provide an earth moving implement attachable to tractor draft links and which can be operated during either the forward or reverse travel of the tractor. It is a further object of my invention to provide a lift and carry soil scoop for attachment to the draft links of a tractor and which can be simply and conveniently adjusted for successful operation upon either forward or reverse movement of the tractor. It is a still further object of my invention to provide an improved two-way soil scoop which is quickly and easily converted for either pushing or pulling operation. Still another object of my invention is to provide a two-way scoop which dumps in a direction away from the tractor whether connected for digging in the forward or reverse tractor movement.

Such earth moving implements are advantageously employed in a tractor having draft control means such as that incorporated in the well-known Ferguson system which automatically adjusts the implement to operate at such a depth as to subject the tractor to a constant draft or soil resistance. In such a system a pair of draft links trailingly supported on the tractor provide the hitch for the implement and the soil resistance to the implement causes it to tend to rotate about the hitch and thus place in compression an upper or top control link which applies pressure to a spring-biased control element on the tractor. Through a hydraulic system the draft links are raised or lowered in response to the compression of the top link to maintain the draft at a constant predetermined value. Such a draft system would not normally operate when used to push an implement since the top link would be in tension.

It is, therefore, another object of my invention to provide an earth moving implement for connection to a tractor having a draft control hitch of the type described which can be successfully employed for either forward or reverse travel of the tractor. It is still another object of my invention to provide a dig and carry type of soil scoop attachable to a Ferguson system draft control hitch for draft control operation in the reverse direction of the tractor.

Other objects and advantages of the invention will become apparent in the detailed description of the preferred embodiment disclosed in the accompanying drawings in which:

Figure 1 is a side elevation of the rear of the well-known Ferguson tractor with a soil scoop implement embodying the invention and attached thereto in forward digging position.

Fig. 2 is a corresponding side elevation with the soil scoop in reverse digging position.

Fig. 3 is a side view showing the forward connected scoop of Fig. 1 raised and tipped to dumping position.

Fig. 4 is a sectional view showing in detail a feature of the upper link construction utilized in the forward connection of the scoop.

Fig. 7 is a perspective view of the scoop shell and frame with the shell positioned within the frame for forward digging.

Figure 5:
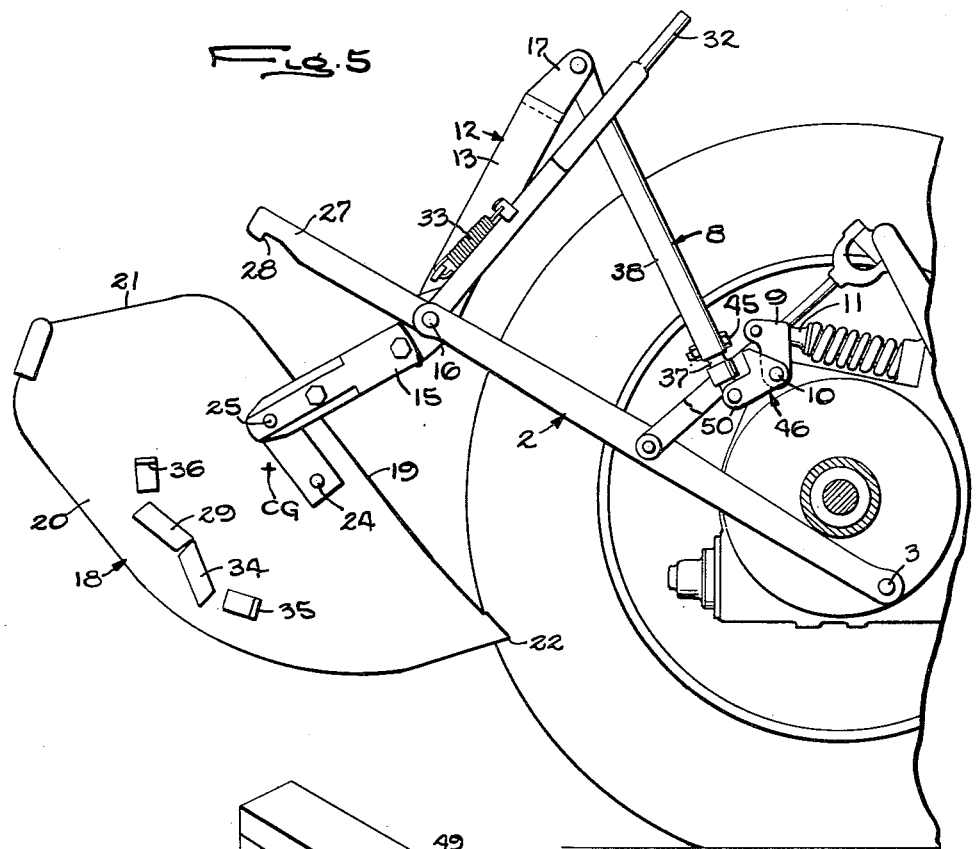
Fig. 5 is a side view showing the reverse-connected scoop of Fig. 2 raised and tipped to dumping position.

While the invention is susceptible of various modifications and alternative constructions I have shown in the drawings and will here describe in detail the preferred embodiment but it is to be understood that I do not thereby intend to limit the invention to the specific form disclosed but intend to cover all modifications, alternative constructions and equivalents falling within the spirit and scope of the invention as expressed in the appended claims.

Referring more particularly to the exemplary embodiment of the invention illustrated in the drawings there will be seen that the dig and carry earth moving attachment is shown attached to a tractor 1, partially shown, suitably a light-weight agricultural tractor which those skilled in the art will readily identify as being equipped with the well-known Ferguson system. For details of the latter reference may be made to Henry George Ferguson Patent No. 2,118,180 issued May 24, 1938. In such a tractor a pair of laterally spaced lower draft links 2 is arranged to trail the rear end portion of the tractor, being pivoted at 3 for vertical swing on the differential housing 4 of the tractor. These draft links 2 are connected by drop links 5 with a pair of vertically oscillatable crank arms 6 rigidly connected to a rocker shaft 7 adapted to be rocked by a hydraulic power unit (not shown) on the tractor. By suitable actuation of the hydraulic unit the draft links may be swung between an elevated transport position and a lower working position.

In conventional arrangements of this type of automatic draft control (see Figs. 1 and 3) the engagement of the earth moving implement with the ground results in a moment about the lower draft link hitch and compresses an upper or control link 8 (having special features described herein) to cause it to bear upon a rocker member 9 to which it is pivotally connected. A rocker pivot 10 is offset from the compressional force direction provided by the upper link 8 so that the rocker can transmit force against a spring biased control plunger 11 regardless of the degree of elevation of the upper link. The amount of movement of the rocker 10 against the present spring resistance controls a power unit which raises or lowers the lower draft links to maintain a predetermined draft on the implement. The general structure and the advantages associated with this type of draft control in which liftable lower draft links are normally placed in tension by the implement load and an upper draft link is placed in compression by the load moment about the draft hitch so as to provide a draft responsive force for controlling the draft link elevation means is well known in the art and discussed briefly here for a better appreciation of the present invention.

Referring now to the implement itself, a generally

U-shaped bail or frame member 12 is provided having vertical side arms 13 integral at their upper ends with a cross member 14. Lower end extensions 15 of each side 13 are inclined rearwardly, that is, in a direction away from the tractor 1, when the bail is in its normal operating position, and are bolted in position so that they may be removed to facilitate conversion of the implement. A pivot pin 16 is fixed on each side arm 13 each pin projecting outwardly for engaging pivot holes or bearings in the ends of the lower draft links 2. A center bracket 17 in the form of a pair of ears fixed to the cross member 14 of the bail facilitates a pivotal engagement with the upper draft link 8 so that upon lifting of the draft links 2 by the powered drop links 5, the bail or frame 12 remains in its approximately vertical position while elevated.

A scoop 18 suitably in the form of a heavy sheet metal bowl having a bottom 19, side walls 20 and an inclined back retaining wall 21 is also provided with a front digging edge 22 preferably made of hardened steel. The center of gravity of the scoop is indicated at C, G. The scoop is arranged to be pivotally supported from the bail 12 either about a forward axis between the center of gravity and the front digging edge of the scoop or about a rear axis between the center of gravity and the back of the scoop. To this end, reinforcing plates of relatively heavy steel 23 are welded on opposite sides 20 of the scoop with a first or forward pair of alined pins 24, each one extending outwardly from one support plate 23 in a position ahead of the center of gravity of the scoop and a second or rear pair of alined pivot pins 25 similarly arranged but positioned behind the center of gravity. Either pair of pivot pins can be journaled in pivot bearings in the end of the bail.

As shown in the forward connection in Fig. 1 the bail engages the forward pivot pins 24 with the forward or digging edge of the scoop directed towards the tractor. The loaded scoop when elevated, therefore tends to tip or dump in a backward direction and to the rear, that is, away from the tractor. Latch means for releasably holding the bail against tipping or dumping are provided in the form of latch arms 27 notched at 28 so that they overhang the scoop center of gravity and hook over latch stop members 29 in the shape of blocks welded to the scoop side surfaces above the scoop pivots and behind the scoop center of gravity towards the rear wall of the scoop. Each latch arm 27 is pivoted on a draft link pivot pin 16 and has upper extensions 30 beyond the pivot which are joined by a cross member 31 having an upstanding handle 32 or other means attached thereto so that the tractor operator may release the latch by pulling the handle forward. As will be noted from observation of the drawings, when the handle 32 is pulled forward each latch arm 27 is raised out of engagement with a latch stop 29 leaving the scoop of Fig. 1 free to rotate backwards for rear dumping. To prevent latch release due to vibration and jarring, a bias spring 33 is connected between each bail side 13 and the corresponding latch arm extension 30 to thus bias the latch arms 27 downwardly in latched position. As may be noted, each side of the scoop has an additional latch stop 34 placed for latch engagement when the scoop is pivoted on the rear pivot pins 25 and rearwardly directed. The latch stops 34 are also above the pivot pins and behind the center of gravity when the scoop is connected in reverse position, which is to say they are between the digging edge and center of gravity of the scoop.

A first pair of bail scoop blocks or abutments 35 are also fastened to the scoop, one being welded on each side 20 of the scoop above the forward pivot pins 24 to engage the bail arms 13 and prevent the scoop from tipping forwardly towards the tractor so that the maximum digging angle for a given position of the bail cannot be exceeded. Likewise a second pair of bail abutments 36 corresponding to the first pair is welded to the scoop sides above the rear or reverse pivot pins 36 for restraining the scoop from tipping or dumping over its rear wall towards the tractor when the bail is pivoted on the rear set of pins 25 for reverse operation as in Figs. 2 and 5.

Referring again to the arrangement of the implement for operation when the tractor is driven in the normal forward direction as indicated in Figs. 1 and 3, the upper link arm 8 is made slidingly adjustable in length, this being suitably provided by making the link of a telescoping inner rod member 37 which may be suitably pivoted at one end to the tractor rocker member 9 and an outer tube member 38 which is pivotally connected to the bail at the bracket 17. As may be more particularly seen with reference to Fig. 4, the other end of the tubular member 38 has an inner flange 39 and the end of the rod 37 within it has an external shoulder 40 so that the telescoping members cannot become disengaged. Accordingly, as may be seen in Fig. 3, when draft links 1 are raised so as to lift the entire scoop implement, the upper telescoping link 8 increases to its maximum because of the tension of the upright bail. This adjustable feature prevents the scoop 18 from being forwardly tipped to prematurely dump the scoop load. Accordingly, the scoop may be raised after being loaded to the desired carrying height and transported to the desired dumping location by the tractor. Upon release of the latch 27 the loaded scoop, being overbalanced, pivots rearwardly about the forward scoop pivot pins 24 and dumps its load as it is inverted, the inverted position being shown in Fig. 3. When the draft links are again lowered, the scoop drags along the ground and is righted thereby so that it again assumes the digging position shown in Fig. 1.

The operation of the draft control system on the tractor and its cooperation with the implement as indicated in Figs. 1 and 3 may be more fully appreciated by further reference to the particular construction and operation of the upper link 8. When the righted scoop of Fig. 1 is dragged along the ground its cutting edge tends to enter the ground or earth at a digging angle governed by the minimum length of the adjustable top link 8. The resistance or reaction of the earth to the scoop tends to rotate the frame or bail 12 about the draft link pivots 16 so that the top cross member of the bail tends to swing towards the tractor, thus placing the upper link 8 in compression. To limit the telescoping travel of the link a thrust sleeve 41 on the rod 37 of the telescopic top link is fastened thereto. When the compressional force transmitted to the spring-biased control plunger 11 exceeds a given predetermined value the hydraulic actuating mechanism raises the draft links 2—2 thus lifting the scoop to thus maintain the draft or drag on the tractor at a substantially uniform safe value. As may be appreciated from the drawings, the angle at which the scoop initially enters the earth may be adjusted to provide the optimum operating conditions for different textures or densities of soil or other material being scooped by adjusting the position of the thrust sleeve 41 on the upper link telescoping rod. To this end a plurality of holes 43 (shown in Fig. 7) are spaced along the end length of the rod near the rocker member 9 so that holes 44 in the sleeve member may be alined with the desired rod opening and a thrust pin 45 inserted in the sleeve and rod to lock it in place. This may readily be done by the operator in the tractor seat.

When it is desired to push the scoop by reversing the tractor rather than to drag the scoop by forward tractor motion, the same implement is quickly and conveniently converted to operate in the reverse direction without loss of the draft control and dumping features associated with the more conventional forward operation for which the draft control is designed. Thus as shown in Fig. 2, the scoop 18 is reversed within the scoop bail 12 and directed rearwardly, that is, away from the tractor. The scoop is also pivoted on the rear set 25 of scoop pivot pins, a bail extension arm 15 having first been removed from the tractor draft links to facilitate the pivot reassembly. In this position the scoop is over-balanced to swing over its own forward or cutting edge and dump its load conveniently rearwardly away from the tractor as shown in Fig. 5. As in the forward connection of Fig. 3, the load is thus dumped rearwardly away from the tractor, even though the reversal of the scoop does not result in the same dumping direction relative to the scoop digging edge as before. With the reverse or pushing motion the latch arms 27 now engage the second set of latch stops 34 to prevent the cutting edge of the scoop from tipping downwardly except when released, thus maintaining the soil cutting or engaging angle. The second pair of bail stops 36 prevents the scoop from becoming overbalanced and tipping in other direction due to tilting of the bail 12 when the scoop is elevated for transport.

Figure 6:
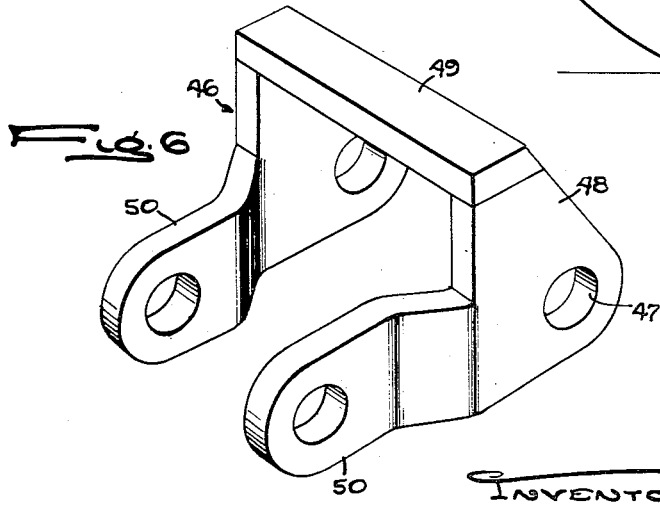
Fig. 6 is a perspective view of the force reversing lever utilized in the reverse connection of the scoop.

Since the upper draft link 8 is in tension rather than in compression when the scoop is pushed by a reversely travelling tractor, the arrangement of the upper link previously described for forward operation would prevent useful employment of the tractor draft control system. Accordingly, a reversing lever is employed in the linkage between the upper link and the control plunger which may suitably take the form of a duplex bell crank 46 as shown in detail in Fig. 6 having a center bearing 47 pivoted on the hitch pin 10 which is additionally conventionally employed for pivoting the rocker arm 9 to the tractor. The upward arms 48 of the crank carry a cross bearing member 49 between them which in adapted to engage the rocker arm in or near the region where it is normally pivoted to the upper link for conventional forward operation. It will be seen that by vertically swinging the bell crank arm, the cross member 49 between the upper bell crank arms 48 provides more or less compressional force against the rocker arm 9. The upper link is pivotally connected to the lower crank arm 50 and the link is made sufficiently long so that at zero or low link tensions the lower bell crank arm 50 is below a line between the hitch pin 10 and the bail bracket 17. Accordingly, when the tension on the upper link 8 increases with the increasing moment caused by the increasing ground resistance encountered by the scoop, the lower end 50 of the bell crank is moved upwardly with the result that pressure is applied against the control plunger to provide the aforementioned draft control. Since the length of the upper link must be fixed for proper operation, alined holes 51 are provided in the end of the telescoping tube (shown in Fig. 7) and a pin positioned through the tube and one of the previously mentioned positioning spaced openings 43 in the rod to fix the telescoping link length. For convenience, the pin 45 is removed from the thrust sleeve 41 and used to lock the link, the thrust sleeve 41 suitably remaining free on the link rod during reverse operation of the implement.

Since the upper link 8 is not free to expand in length when the scoop is raised while assembled for reverse or pushing operation, there is some downward inclination of the back 21 of scoop. However, the bail stops 36 limit any tendency of the scoop to become overbalanced and to turn in that direction. Instead, as previously mentioned, dumping is provided when desired by release of the latch arms 27 so that the cutting edge 22 of the scoop swings downwardly to dump the scoop load. As with the case of the forward operation, after the load has been dumped, the scoop will right itself due to friction with the ground when the implement is lowered and the tractor moved in the reverse direction.

It will be seen that in accordance with my invention a very simple arrangement is provided whereby the scoop can be reversed for operation during reverse motion of the tractor with the advantages attendant upon the operation associated with the conventional forward motion and more specifically without losing the benefits of the automatic draft control commonly incorporated in a tractor for use during forward motion of the tractor and implement.

I claim as my invention:

1. A reversible dig and carry implement for attachment behind a tractor having a pair of draft links trailingly pivoted on its rear end portion for a vertical movement by a power unit on the tractor, which comprises a scoop-supporting bail pivotally attachable between said draft links and liftable thereby, a scoop having a first pair of pivot means at opposite sides thereof between its center of gravity and its digging edge for pivotally engaging the bail ends to swingably suspend said scoop with the digging edge directed forwardly towards the tractor, an alternate pair of pivot means at opposite sides of said scoop between said rear wall and said center of gravity for pivotally engaging said bail ends to swingably suspend said scoop with the digging edge directed rearwardly away from the tractor, means to prevent swinging of the bail about its pivotal attachment when the scoop carried thereby is digging either toward or away from the tractor and means for holding said scoop in a fixed position relative to said bail having release means to permit the weight of the scoop acting through the center of gravity to swing the scoop for dumping in a direction away from the tractor when the scoop is positioned for either forward or reverse direction digging.

2. A reversible dig and carry earth moving implement for attachment behind a tractor having a pair of draft links trailingly pivoted on its rear end portion for a vertical movement by a power unit on the tractor, which comprises, in combination, an upright scoop-supporting bail having depending legs with rearwardly extending end portions, means at corresponding intermediate points in the legs for pivotally engaging said draft links, a scoop having opposing side walls and a front digging edge, a forward pivot means at opposite sides of said scoop between the center of gravity thereof and the front digging edge for pivotally engaging said bail ends to swingably suspend said scoop with said scoop digging edge directed forwardly toward the tractor, forward abutments on said side walls of said scoop above said forward pivot means to limit tilting of said scoop relative to said bail in a direction toward the tractor when the scoop is forwardly directed, a reverse pivot means at opposite sides of said scoop between said rear wall and said center of gravity for pivotally engaging said bail ends to swingably suspend said scoop with said scoop digging edge directed reversely away from the tractor, reverse abutments on said side walls of said scoop respectively fixed above said reverse pair of pivot means to limit tilting of said scoop relative to said bail in a direction toward the tractor when the scoop is reversely directed, means to prevent swinging of said bail about its pivotal engagement with said draft links when the scoop carried by the bail is digging in either direction, and releasable latch means to permit gravity dumping of the scoop in a direction away from the tractor from an elevated position when positioned for either forward or reverse direction digging.

3. A reversible dig and carry earth moving implement for attachment behind a tractor having a pair of lower draft links trailingly pivoted on its rear end portion for a vertical movement by a power unit on the tractor which comprises in combination a scoop-supporting bail having depending upright legs with rearwardly extending end extensions, means at intermediate points in the legs for pivotally engaging said draft links, a scoop having opposing side walls, a front digging edge, and a retaining rear wall, a forward pair of pivot pins fixed on opposite sides of said scoop between the center of gravity axis thereof and the front digging edge for pivotally engaging the ends of said bail extensions to swingably suspend said scoop with said scoop digging edge directed forwardly toward the tractor, a forward latch stop on a side wall between said center axis and the scoop rear wall, a forward bail stop on a side wall above a forward pivot pin on the same side of the center of gravity to limit tilting of said scoop in a direction toward the tractor when the scoop is forwardly directed, a reverse pair of pivot pins fixed on opposite sides of said scoop between said rear wall and said center axis for pivotally engaging said bail ends to swingably suspend said scoop with the digging edge directed reversely away from the tractor, a reverse latch stop on a scoop side wall between said center axis and the front digging edge, a reverse bail stop on a side wall fixed above a reverse pair of pivot pins on the same side of the center of gravity to limit tilting of said scoop in a direction toward the tractor when the scoop is reversely directed, means to prevent swinging of said bail about its pivotal engagement with said draft links when the scoop carried by the bail is digging in either direction, a latch arm pivotally connected to said bail overhanging said center axis for engaging one of said latch stops, and means for lifting said latch arm to permit gravity dumping of the scoop in a direction away from the tractor from an elevated position when the scoop is positioned for either forward or reverse direction digging.

References Cited in the file of this patent

UNITED STATES PATENTS

| | | |
|---|---|---|
| 2,107,895 | Lundstrom | Feb. 8, 1938 |
| 2,548,461 | Arps | Apr. 10, 1951 |
| 2,641,854 | Nelson | June 16, 1953 |

OTHER REFERENCES

Spokely: Abstract of application Ser. No. 99,751, pub. November 13, 1951, 652 O. G. 617–18.